US012590844B2

(12) United States Patent
Dangler et al.

(10) Patent No.: US 12,590,844 B2
(45) Date of Patent: Mar. 31, 2026

(54) THERMOGRAPHIC IMAGING FOR QUALITY ANALYSIS

(71) Applicant: INTERNATIONAL BUSINESS MACHINES CORPORATION, Armonk, NY (US)

(72) Inventors: John R. Dangler, Rochester, MN (US); Tory Johnson, Rochester, MN (US); Gunnar Mills, Salt Lake City, UT (US); Austin Carter, Olmsted, MN (US); Susan Zichittella, Red Hook, NY (US); Colin Edward Masterson, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 756 days.

(21) Appl. No.: 18/050,514

(22) Filed: Oct. 28, 2022

(65) Prior Publication Data

US 2024/0142312 A1 May 2, 2024

(51) Int. Cl.
*G01J 5/48* (2022.01)
*G06T 1/60* (2006.01)

(52) U.S. Cl.
CPC . *G01J 5/48* (2013.01); *G06T 1/60* (2013.01)

(58) Field of Classification Search
CPC ....... G01J 5/48; G01J 2005/0077; G06T 1/60; G01N 25/72
USPC ....................................................... 430/348
See application file for complete search history.

(56) References Cited

U.S. PATENT DOCUMENTS

| | | |
|---|---|---|
| 8,985,848 B2 | 3/2015 | Heath et al. |
| 9,194,831 B2 | 11/2015 | Traxler |
| 9,811,900 B2 | 11/2017 | Maresca, Jr. |
| 9,983,156 B2 | 5/2018 | Shepherd |
| 10,116,884 B2 | 10/2018 | Beall |
| 10,175,186 B2 | 1/2019 | Glynn et al. |
| 10,546,207 B2 | 1/2020 | Sundaresan |
| 10,777,471 B2 | 9/2020 | Jacobs |

(Continued)

FOREIGN PATENT DOCUMENTS

| | | |
|---|---|---|
| EP | 3279648 A1 | 2/2018 |
| EP | 3312009 A1 | 4/2018 |

OTHER PUBLICATIONS

A Novel Non-Destructive Inspection Technique to Detect Counterfeit Electronic Components Using Thermography (NITECT), Blog, 9 Pgs, Accessed Oct. 3, 2022, <https://passive-components.eu/a-novel-non-destructive-inspection-technique-to-detect-counterfeit-electronic-components-using-thermography-nitect/>.

(Continued)

*Primary Examiner* — Caleen O Sullivan
(74) *Attorney, Agent, or Firm* — Stosch Sabo

(57) ABSTRACT

Described are techniques for quality analysis using thermographic imaging. In one example, a system including a test chamber for receiving an unpowered component. The system further includes an external heat source for heating the unpowered component for a predetermined period of time. The system further includes a thermographic imaging system for collecting thermographic images of the unpowered component during the predetermined period of time. The system further includes a computer communicatively coupled to the thermographic imaging system and configured to classify a quality of the unpowered component based on the thermographic images of the unpowered component.

18 Claims, 7 Drawing Sheets

(56) References Cited

U.S. PATENT DOCUMENTS

| | | | |
|---|---|---|---|
| 10,996,177 B2 | 5/2021 | Robbins | |
| 11,039,089 B2 | 6/2021 | Mulaveesala | |
| 11,192,665 B2 | 12/2021 | Holmes | |
| 11,218,112 B2 | 1/2022 | He | |
| 11,373,264 B2 | 6/2022 | Juarez | |
| 2017/0336156 A1* | 11/2017 | Phillips | F28F 27/00 |
| 2019/0114755 A1 | 4/2019 | Lee | |
| 2019/0300205 A1* | 10/2019 | Georgeson | G01N 25/20 |
| 2020/0200692 A1* | 6/2020 | Wang | G01N 25/72 |
| 2020/0355601 A1* | 11/2020 | Amer | G06N 3/0442 |
| 2021/0055241 A1 | 2/2021 | Lee | |
| 2021/0383563 A1 | 12/2021 | Cheng | |
| 2022/0042940 A1 | 2/2022 | Bellucco | |

OTHER PUBLICATIONS

Abesamis et al., "NASA Counterfeit Parts Awareness and Inspection" Accessed on Oct. 28, 2022, 124 Pgs.

Deng et al., "Object-Based Thermal Image Segmentation for Fault Diagnosis of Reciprocating Compressors", Sensors 2020, 20, 3436; doi:10.3390/s20123436, Published Jun. 18, 2020, 11 Pgs, <www.mdip.com/journal/sensors>.

Drivewyze Infrastructure Services—Drivewyze, "Intelligent Imaging Systems is Now Drivewyze Infrastructure Services", 5 Pgs, Accessed on Sep. 20, 2022., <https://intelligentimagingsystems.com/smart-roadside-technologies/thermal-inspection-system/>.

Milovanovic et al., "Principal Component Thermography for Defect Detection in Concrete", Published Jul. 13, 2020, Sensors 2020, 20, 3891; doi:10.3390/s20143891, 21 Pgs, <www.mdip.com/journal/sensors>.

Sensible Micro Corporation, "4 Inspection Methods to Identify Counterfeit Electronic Components", Feb. 18, 2019, 9 Pgs, <https://www.sensiblemicro.com/blog/detect-counterfeit-electronic-components>.

Sood et al., "Screening for Counterfeit Electronic Parts", Center for Advanced Life Cycle Engineering (CALCE) Dept. of Mechanical Engineering University of Maryland, College Park, MD, Access on Sep. 20, 2022, 12 Pgs.

Taher-Garavand., "2015—An Intelligent Approach for Cooling Radiator Fault Diagnosis Based on Infrared Thermal Image Processing Technique", Applied Thermal Engineering 87 (2015), 11 Pgs, <www.elsevier.com/locate/apthermeng>.

Teledyne FLIR—Advanced Thermal Imaging Camera, FLIR E96, Model: FLIR E96 24, Accessed on Sep. 20, 2022, 7 Pgs, <https://www.flir.com/products/e96/>.

Wei et al., "Crack Identification of Infrared Thermal Imaging Steel Sheet Based on Convolutional Neural Networks", MATEC Web of conferences 232, 01053 (2018), 6 Pgs, <https://doi.org/10.105/mateccomf/201823201053>.

Workswell Infrared Cameras and Systems, "Printed Circuit Board (PCB) Inspection via Thermal Imaging", Accessed on Sep. 20, 2022, 6 Pgs, <https://workswell-thermal-camera.com/pcb-inspection-by-thermal-imaging/>.

Yang et al., "Infrared Thermal Imaging-Based Crack Detection Using Deep Learning", IEEE Access Dec. 26, 2019, vol. 7,,10.1109/ACCESS.2019.2958264, 18 Pgs, <http://creativecommons.org/licenses/by/4/0/>.

* cited by examiner

400

402
RECEIVE ONE OR MORE THERMOGRAPHIC IMAGES OF AN UNPOWERED COMPONENT EXPOSED TO AN EXTERNAL HEAT SOURCE

404
DETERMINE WHETHER THE UNPOWERED COMPONENT IS DEFECTIVE BASED ON OUTPUT FROM A MACHINE LEARNING MODEL

406
PRESENT A QUALITY CLASSIFICATION WITH AN IDENTIFIER OF THE UNPOWERED COMPONENT

500

510

600

602
DOWNLOAD, FROM A REMOTE DATA PROCESSING SYSTEM AND TO ONE OR MORE COMPUTERS, THERMOGRAPHIC QUALITY ANALYSIS CODE

604
EXECUTE THE THERMOGRAPHIC QUALITY ANALYSIS CODE

606
METER USAGE OF THE THERMOGRAPHIC QUALITY ANALYSIS CODE

608
GENERATE AN INVOICE BASED ON METERING THE USAGE

700

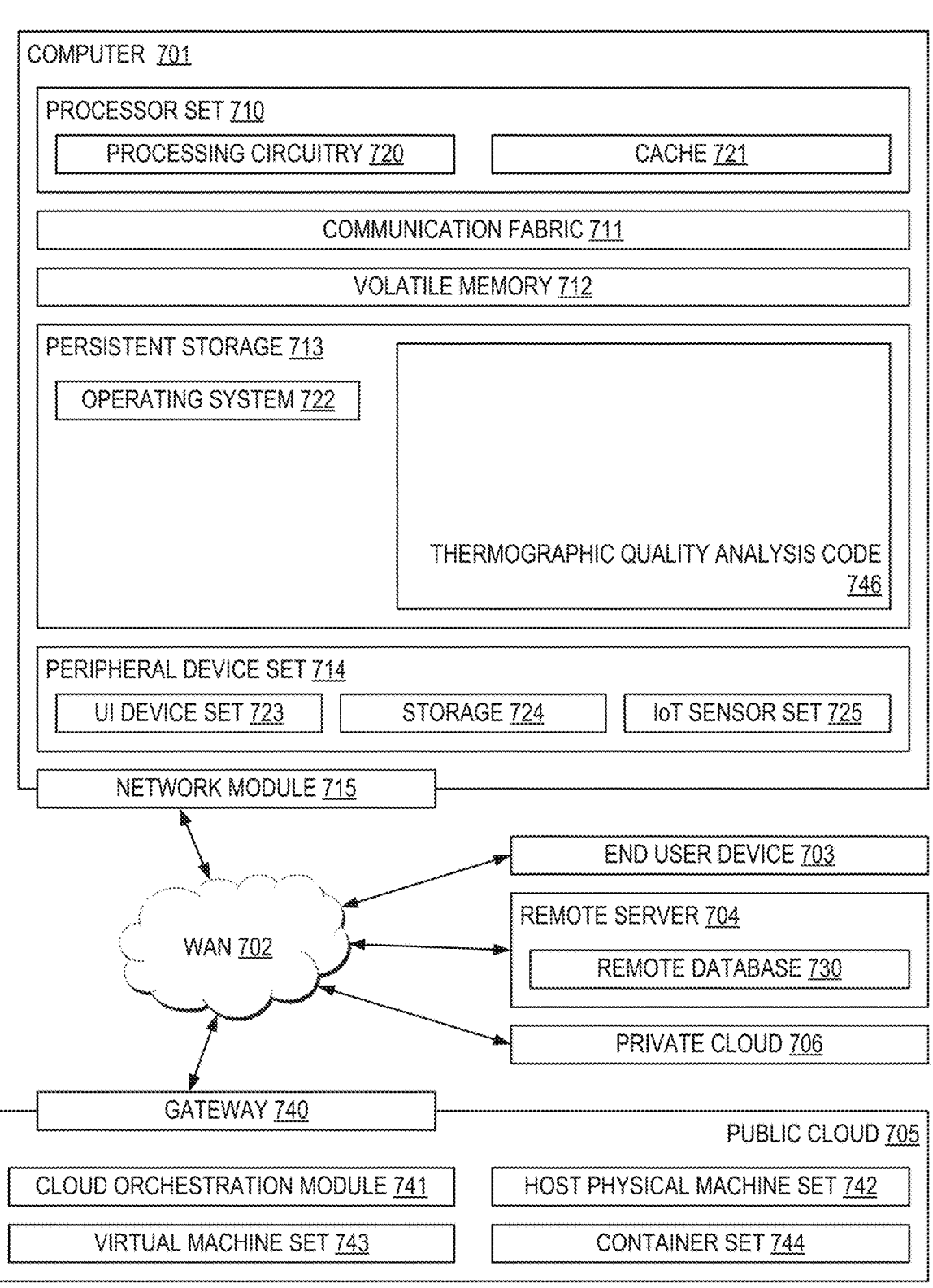

COMPUTER 701

PROCESSOR SET 710

PROCESSING CIRCUITRY 720          CACHE 721

COMMUNICATION FABRIC 711

VOLATILE MEMORY 712

PERSISTENT STORAGE 713

OPERATING SYSTEM 722

THERMOGRAPHIC QUALITY ANALYSIS CODE 746

PERIPHERAL DEVICE SET 714

UI DEVICE SET 723     STORAGE 724     IoT SENSOR SET 725

NETWORK MODULE 715

WAN 702

END USER DEVICE 703

REMOTE SERVER 704

REMOTE DATABASE 730

PRIVATE CLOUD 706

GATEWAY 740

PUBLIC CLOUD 705

CLOUD ORCHESTRATION MODULE 741     HOST PHYSICAL MACHINE SET 742

VIRTUAL MACHINE SET 743     CONTAINER SET 744

FIG. 7

THERMOGRAPHIC IMAGING FOR QUALITY ANALYSIS

BACKGROUND

The present disclosure relates to quality analysis, and, more specifically, to thermographic imaging for quality analysis.

Quality analysis can include inspecting components to verify compliance with engineering specifications. Inspection can take various forms. For example, visual inspection can be performed to detect obvious deformities, defects, and/or deficiencies in a manufactured component. Tools and/or fixtures can be used to precisely measure dimensions, finishes, weights, and/or other characteristics of a component. In some situations, functionality can be tested or simulated to verify satisfactory performance for an end-use application.

SUMMARY

Aspects of the present disclosure are directed toward a system comprising a test chamber for receiving an unpowered component. The system further comprises an external heat source for heating the unpowered component for a predetermined period of time. The system further comprises a thermographic imaging system for collecting thermographic images of the unpowered component during the predetermined period of time. The system further comprises a computer communicatively coupled to the thermographic imaging system and configured to classify a quality of the unpowered component based on the thermographic images of the unpowered component.

Aspects of the present disclosure are directed toward a computer-implemented method comprising receiving, at a computer and from a thermographic imaging system, thermographic images of an unpowered component exposed to an external heat source for a predetermined period of time. The method further comprises determining, by a machine learning model implemented on the computer, whether the unpowered component is defective. The machine learning model can be trained using a corpus of historical thermographic images for the unpowered component. The method further comprises presenting a quality classification with an identifier of the unpowered component on an interface communicatively coupled to the computer. The classification can be based on an output of the machine learning model.

Additional aspects of the present disclosure are directed to systems and computer program products configured to perform the method described above. The present summary is not intended to illustrate each aspect of, every implementation of, and/or every embodiment of the present disclosure.

BRIEF DESCRIPTION OF THE DRAWINGS

The drawings included in the present application are incorporated into and form part of the specification. They illustrate embodiments of the present disclosure and, along with the description, serve to explain the principles of the disclosure. The drawings are only illustrative of certain embodiments and do not limit the disclosure.

FIG. 7 illustrates a block diagram of an example computing environment, in accordance with some embodiments of the present disclosure.

Figure 1:
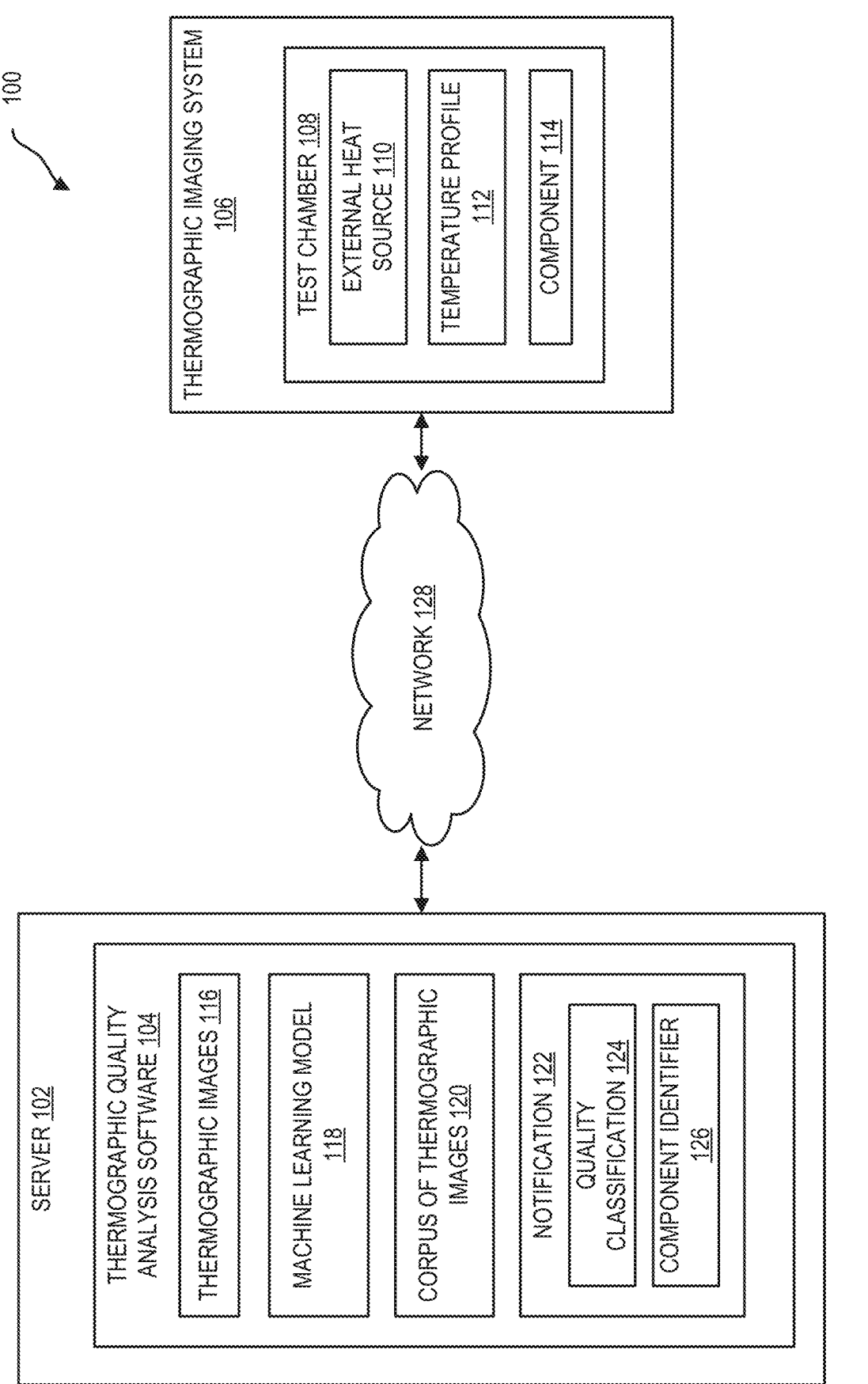
FIG. 1 illustrates a block diagram of an example computational environment implementing thermographic quality analysis software, in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed toward quality analysis, and, more specifically, to thermographic imaging for quality analysis. While not limited to such applications, embodiments of the present disclosure may be better understood in light of the aforementioned context.

One challenge related to quality analysis involves inspection of internal components of a manufactured assembly (or sub-assembly). For example, internal components often cannot be inspected by visual inspection. While x-ray inspection can be utilized for some internal inspection applications, x-ray machines are expensive, require significant safety precautions, and require setup and teardown processes (e.g., fixturing) for each tested component. Likewise, functionality testing (e.g., running current through a fabricated (or semi-fabricated) circuit board) provides limited information regarding whether the internal components comply with the relevant engineering specifications. For example, a circuit board with a missing heatsink may pass a brief functionality test. Thus, there is a need for economic, safe, and effective inspection techniques for internal components of a manufactured assembly (or sub-assembly).

Aspects of the present disclosure are directed to overcoming the aforementioned challenges by utilizing thermographic imaging to perform quality analysis of internal components of a manufactured assembly (or sub-assembly). As is understood by one of skill in the art, different materials exhibit different thermal properties (e.g., heat capacity, heat conductivity, etc.). As a result, when a multi-material component is heated and/or cooled, a unique thermal signature is exhibited by the multi-material component. As one example, the thermal signature can be a snapshot of thermal characteristics of the multi-material component after a predetermined heating and/or cooling cycle. As another example, the thermal signature can be a sequence of thermal characteristics of the multi-material component over the course of a predetermined heating and/or cooling cycle, where the sequence of thermal characteristics reflects a rate of temperature change (or thermal path) during the predetermined heating and/or cooling cycle. Any thermal signature is influenced by all aspects of a multi-material component, including internal components. As a result, internal components can be evaluated using thermographic imaging.

The present disclosure realizes numerous advantages. For example, aspects of the present disclosure enable quality analysis of numerous internal features of a component. For a component such as a circuit board, aspects of the present disclosure can be used to evaluate presence, location, position, orientation, integrity, authenticity (e.g., real or counterfeit), connectedness and/or other characteristics of wirebonds, dies, vias, chips, resistors, capacitors, pins, solders, heatsinks, thermal pads, and the like. As another example advantage, thermographic cameras (also referred to as infrared cameras or thermal imaging cameras) are safe, and thus, do not introduce inefficiencies associated with safety protocol compliance (e.g., compared to x-ray evaluation, for example). As another example advantage, aspects of the present disclosure can be performed in real-time by retrofitting thermographic cameras to an existing manufacturing line, where the existing manufacturing line applies a controllable heating profile to each component (e.g., during reflow of a circuit board). As yet another example advantage, aspects of the present disclosure can inspect internal components in an unpowered component (e.g., a component in an unpowered state). Thus, aspects of the present disclosure need not rely on functionality testing to perform pseudo internal component inspection. Furthermore, quality analysis can be performed at intermediate and non-functional stages of fabrication where the quality analysis can be used to identify defective parts at a relatively earlier stage of fabrication. As still another example advantage, aspects of the present disclosure can automate quality dispositions (e.g., defective vs. not defective) by training a machine learning model on a corpus of defective and not defective components. Machine learning models can increase accuracy and efficiency of quality dispositions.

Referring now to the figures, FIG. 1 illustrates a block diagram of an example computational environment 100 implementing thermographic quality analysis software 104, in accordance with some embodiments of the present disclosure. The example computational environment 100 includes a server 102 communicatively coupled to a thermographic imaging system 106 via a network 128.

Server 102 can be any computational configuration of hardware and/or software capable of implementing thermographic quality analysis software 104. In some embodiments, server 102 can be any server, computer, mainframe, or other combination of computer hardware capable of executing software. In some embodiments, server 102 can be a virtual machine (VM), container instance, or other virtualized combination of discrete physical hardware resources.

Thermographic imaging system 106 can be any camera, video camera, smartphone, tablet, wearable device, or other device having a camera capable of capturing thermographic images or video (e.g., a thermographic camera, a thermal imaging camera, an infrared camera, etc.). The thermographic imaging system 106 can be connected to a test chamber 108 storing a component 114 exposed to an external heat source 110 (e.g., a heat source that is external to component 114) configured to implement a temperature profile 112. The test chamber 108 can be configured to physically receive the component 114. For example, the test chamber 108 can be a fixture for holding the component 114, a manufacturing line for transporting and/or performing fabrication steps on the component 114, an isolated environment for performing fabrication, inspection, and/or testing of the component 114, or another physical space configured to receive the component 114.

The test chamber 108 is capable of managing an environment immediately surrounding the component 114, such as, for example, temperature and/or pressure. To manage pressure, the test chamber 108 can increase (e.g., pressurize) or decrease (e.g., vacuum) the pressure on the component 114 in the test chamber 108, relative to atmospheric pressure. Advantageously, aspects of the present disclosure can alter pressure in the test chamber 108 to reduce variation in the temperature profile 112. For example, component 114 can be placed under vacuum pressure when heated by conductive heat or radiant heat by the external heat source 110, where the vacuum pressure can reduce variability in the temperature profile 112 by reducing ambient or otherwise incidental convection.

To manage the temperature of component 114, the test chamber 108 can utilize an external heat source 110. The external heat source 110 can heat the component 114 utilizing conduction, convection, and/or irradiation. When using conduction, the external heat source 110 can physically contact at last one surface of the component 114. When using convection, the external heat source 110 can circulate air at a predefined temperature around the component 114. When using irradiation, the external heat source 110 can direct radiant heat at the component 114. Regardless of the heating method used, the external heat source 110 can be configured to implement the temperature profile 112. The temperature profile 112 can comprise, alone or in combination, one or more predetermined temperatures, one or more rates of change between two or more temperatures, and one or more predetermined periods of time to dwell at any given predetermined temperature.

The external heat source 110 can provide uniform or directional heat to the component 114. When uniform, the external heat source 110 can be positioned to direct heat in an approximately uniform or symmetric distribution over the component 114 so that the thermographic images 116 capture an even application of the temperature profile 112 to the component 114 (although aspects of the component 114 can absorb, distribute, and dissipate the temperature profile 112 in a non-uniform manner). In such embodiments, the camera (s) of the thermographic imaging system 106 can be positioned with or opposite (e.g., 0°, 180°) the external heat source 110. An approximately uniform or symmetric application of the temperature profile 112 to the component 114 can be beneficial in identifying correct presence, location, orientation, and/or dimensions of internal aspects of component 114. As will be appreciated by one skilled in the art, the terms uniform and symmetric discussed above refer to two-dimensional characteristics of the heat directed at the component 114 insofar as a single external heat source 110 necessarily provides "directional" heat through the thickness of component 114. An example thermographic image of a uniformly applied temperature profile is discussed hereinafter with respect to FIG. 2.

In contrast, the external heat source 110 can alternatively provide directional heat to the component 114 so that the thermographic images 116 capture thermal paths (e.g., rates of thermal conductance, rates of temperature change, etc.) through the component 114 from a heated side to an unheated side. In such embodiments, the camera(s) of the thermographic imaging system 106 can be positioned at an approximately right angle (e.g., 90°, 270°) to the external heat source 110. An approximately directional application of the temperature profile 112 to component 114 can be beneficial in verifying connectivity and/or interconnectedness between internal aspects of the component 114. An example thermographic image of a directionally applied temperature profile is discussed hereinafter with respect to FIG. 3.

Component 114 can be any component benefiting from internal inspection via thermographic analysis. Component 114 can be a multi-material component, an assembly, or a sub-assembly, for example. Component 114 can be in a fully fabricated or semi-fabricated state. Component 114 can include one or more internal components. In some embodiments, component 114 includes electronic hardware such as a circuit board. In embodiments where the component 114 is capable of responding to a stimulus (e.g., an electrical impulse for an electronic component, a temperature impulse for a shape-memory polymer (SMP), a hygrothermal impulse for a SMP, a light impulse for an optical component, etc.), the component 114 can be in an unstimulated (e.g., unpowered, deactivated, etc.) state.

The network 128 can be a local area network (LAN), a wide area network (WAN), an intranet, the Internet, or any other network 128 or group of networks 128 capable of continuously, semi-continuously, or intermittently connecting (directly or indirectly) the aforementioned components together.

Server 102 can implement thermographic quality analysis software 104. Thermographic quality analysis software 104 can be configured to perform quality analysis of internal components in component 114 using thermographic images 116 obtained from thermographic imaging system 106. The thermographic quality analysis software 104 can be implemented as a component of, or in conjunction with, a larger software suite related to machine vision, industrial process control, quality analysis/quality control (QA/QC), and the like, such as IBM® Maximo® Visual Inspection. In some embodiments, thermographic quality analysis software 104 can utilize preconfigured algorithms to differentiate defective from compliant parts. In other embodiments, the thermographic quality analysis software 104 can input the thermographic images 116 to machine learning model 118.

Machine learning model 118 can be trained on a corpus of thermographic images 120. The corpus of thermographic images 120 can include images classified as acceptable or defective (e.g., non-compliant, counterfeit, damaged, etc.). In some embodiments, the corpus of thermographic images 120 include a schematic of the component 114 overlaid with each of the thermographic images such that the schematic enables the machine learning model 118 (through training) to correlate respective thermographic signatures to discrete features of the component 114 illustrated in the schematic. The schematic can be a photograph of the component 114, a Computer Aided Design (CAD) drawing or model of the component 114, or another illustration indicating discrete features of the component 114. Machine learning model 118 can comprise algorithms or models that are generated by performing supervised, unsupervised, or semi-supervised training on a dataset, and subsequently configured to apply the generated algorithm or model to predict a quality classification 124 of the component 114.

Machine learning algorithms can include, but are not limited to, decision tree learning, association rule learning, artificial neural networks, deep learning, inductive logic programming, support vector machines, clustering, Bayesian networks, reinforcement learning, representation learning, similarity/metric training, sparse dictionary learning, genetic algorithms, rule-based learning, and/or other machine learning techniques.

For example, the machine learning algorithms can utilize one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBRT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), expectation-maximization algorithm, feedforward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques.

The thermographic images 116 can be input to the machine learning model 118. The machine learning model 118 can output the quality classification 124. The quality classification 124 can indicate whether the component 114 is acceptable or defective. In some embodiments, the quality classification 124 can be binary (e.g., acceptable vs. defective), whereas in other embodiments the quality classification 124 can provide a more nuanced classification of a component 114 determined to be defective (e.g., out-of-tolerance, mis-aligned, mis-oriented, damaged, counterfeit, etc.).

The thermographic quality analysis software 104 can be configured to associate the quality classification 124 with a component identifier 126 of the component 114. The component identifier 126 can be, for example, a serial number of the component 114 or another identifier of the component 114. In some embodiments, the component identifier 126 is merely the thermographic image of the component 114 where the thermographic image (and associated metadata such as time) can be used to identify the correct component 114. The quality classification 124 and the component identifier 126 can be combined together in a notification 122. The notification 122 can be transmitted (e.g., via network 128) to a user interface (not shown) and presented on the user interface. For example, the notification 122 can be presented to a user interface running QA/QC software such as thermographic quality analysis software 104.

FIG. 1 is for illustrative purposes and should not be construed as limiting. More, fewer, and/or different components than the components illustrated in FIG. 1 can be present while remaining within the spirit and scope of the present disclosure. Further, illustrated components can be separated into multiple, discrete components, and/or multiple discrete components can be combined together into a single component, while remaining within the spirit and scope of the present disclosure.

Figure 2:
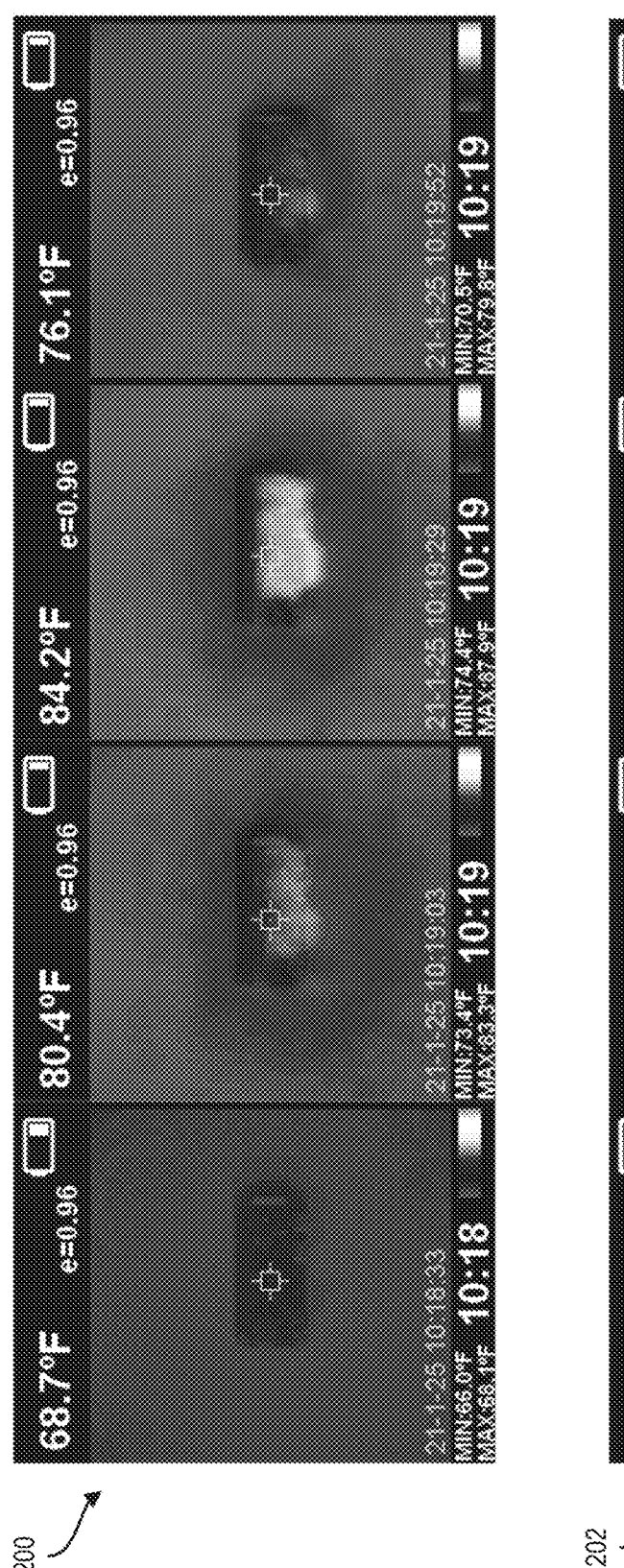
FIG. 2 illustrates thermographic images of components undergoing thermographic quality analysis with a uniform temperature profile, in accordance with embodiments of the present disclosure.
Figure 2:
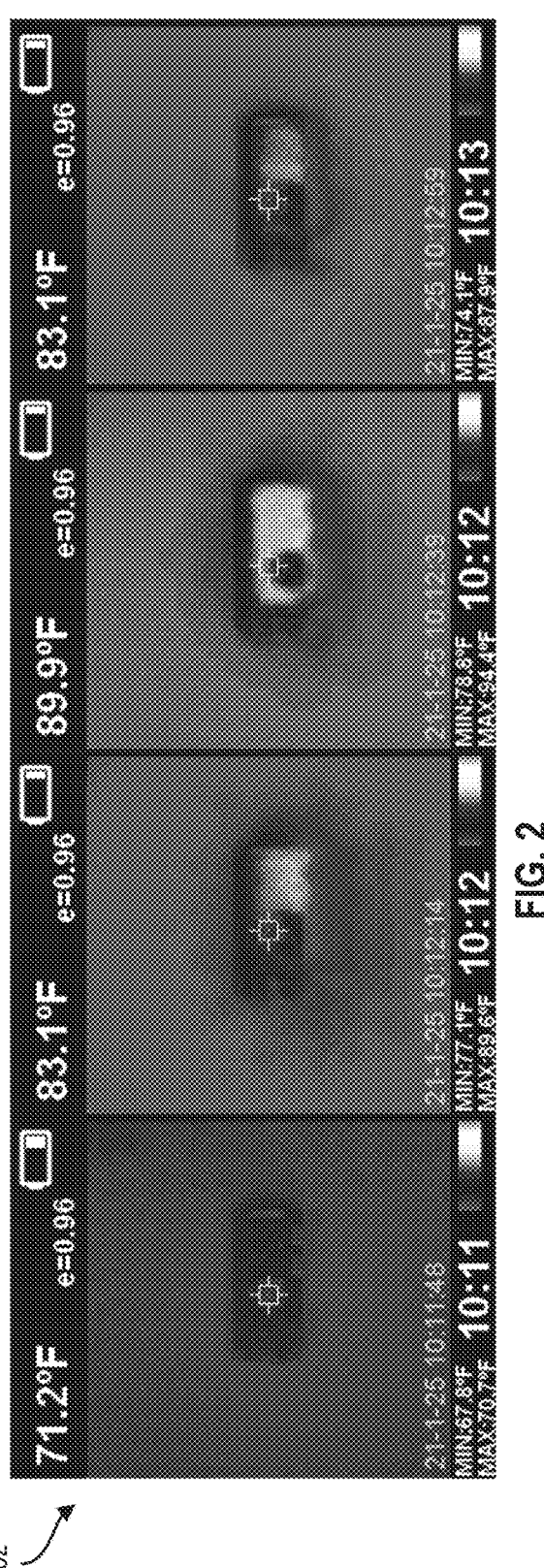

FIG. 2 illustrates thermographic images of components undergoing thermographic quality analysis with a uniform temperature profile, in accordance with embodiments of the present disclosure. The first set of thermographic images 200 illustrate a circuit board (e.g., Raspberry Pi® Zero) with a missing heatsink. The second set of thermographic images 202 illustrate the same type of circuit board with the appropriate heatsink. The existence of the heatsink is evident as shown in the differences between the first set of thermographic images 200 and the second set of thermographic images 202, despite the heatsink being an internal component of the circuit board. More specifically, the third image in each sequence illustrates the respective circuit board with a maximum heat exposure. The third image in the first set of thermographic images 200 exhibits approximately uniform heat throughout the circuit board. In contrast, the third image in the second set of thermographic images 202 exhibits a dark circle demonstrating an area of lower temperature relative to the remainder of the circuit board (and corresponding to the location of a heatsink). In this way, aspects of the present disclosure can differentiate acceptable and unacceptable components (based on internal features) using thermographic images.

As shown in FIG. 2, the first set of images 200 and the second set of images 202 illustrate sequential images exhibiting the pattern of heat distribution through the component over time. In other embodiments, however, a single image can be used. In yet other embodiments, a video of many frames can be used. Furthermore, FIG. 2 illustrates photographs of the circuit board overlayed with thermographic images of the circuit board. In this way, FIG. 2 improves ease of understanding by enabling a user to approximately align different heat signatures with different features of the circuit board. However, in other embodiments, there need not be any photographic overlay and aspects of the present disclosure can exclusively rely on the thermographic images.

Figure 3:
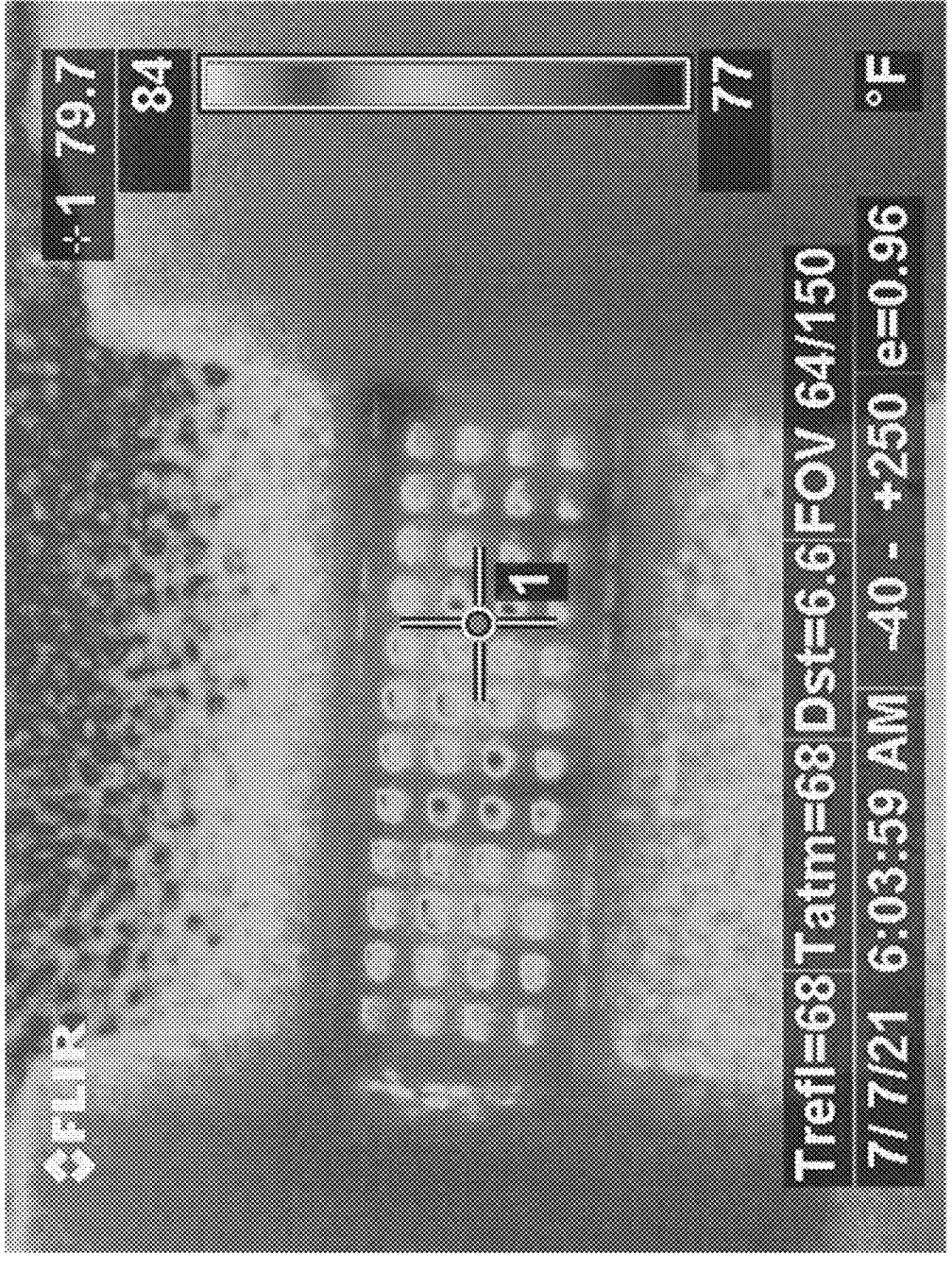
FIG. 3 illustrates a thermographic image of a component undergoing thermographic quality analysis with a directional temperature profile, in accordance with embodiments of the present disclosure.

FIG. 3 illustrates a thermographic image 300 of a component undergoing thermographic quality analysis with a directional temperature profile, in accordance with embodiments of the present disclosure. The thermographic image 300 is a thermographic image of an electronic connector having many pins. The electronic connector is exposed to a directional heat source. In the thermographic image 300, the heat source is applied at the top portion of the image. Quality analysis can be performed on the electronic connector by inferring information from the distribution of heat in the electronic connector as a result of exposure to the directional heat source. For example, the temperature of respective pins, and the temperature between and surrounding respective pins, can indicate connected pins from unconnected (e.g., damaged, defective, etc.) pins. In the thermographic image 300, multiple damaged pins can be identified in the center portion of the electronic connector and indicated by different temperatures of the pins and surrounding areas of the pins. In this way, detection of defective internal components and/or defective connectivity between internal components, can be identified using one or more thermographic images of a component exposed to a directional heat source.

Figure 4:
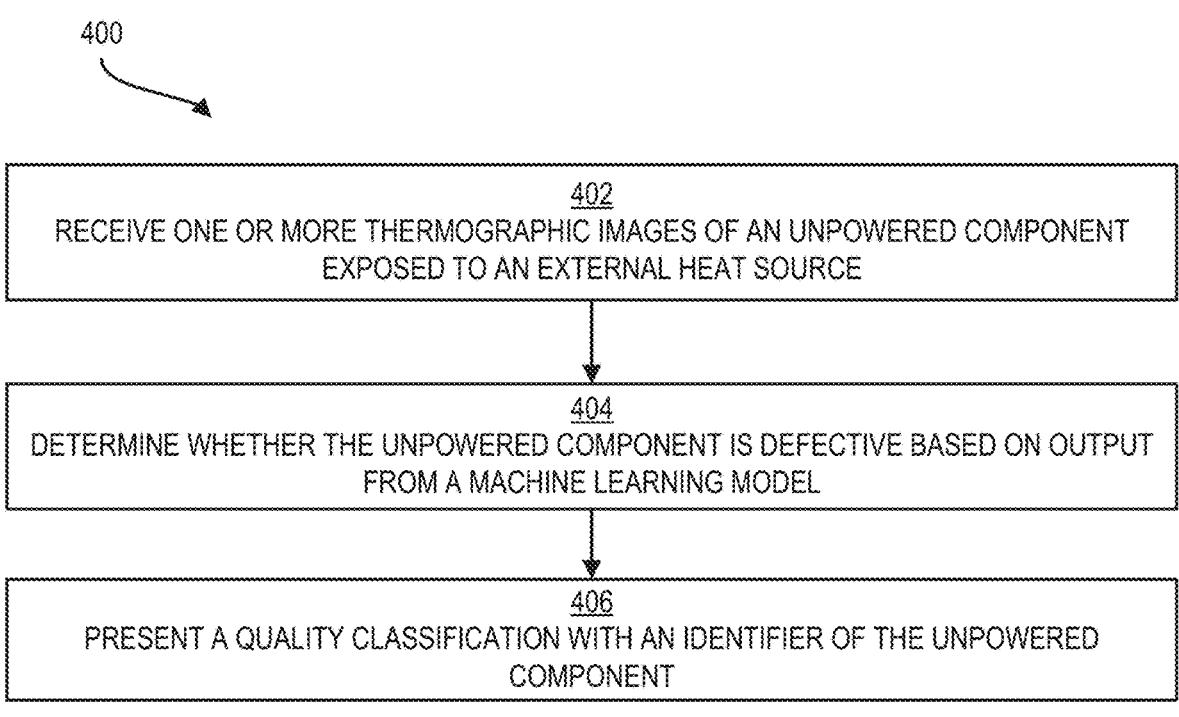
FIG. 4 illustrates a flowchart of an example method for implementing thermographic quality analysis software, in accordance with embodiments of the present disclosure.

FIG. 4 illustrates a flowchart of an example method 400 for implementing thermographic quality analysis software, in accordance with embodiments of the present disclosure. In some embodiments, the method 400 can be implemented by a server (e.g., server 102 of FIG. 1), a computer, a processor, or another configuration of hardware and/or software.

Operation 402 includes receiving one or more thermographic images of an unpowered component exposed to an external heat source. Operation 402 can receive the one or more thermographic images from a thermographic imaging system. The one or more thermographic images can be a single image taken at a predefined time during (or after) the component is exposed to a temperature profile provided by the external heat source. In other embodiments, the one or more thermographic images can be multiple images. As one example, the multiple images can be sequential images comprising a video during (and/or after) applying the temperature profile. As another example, the multiple images can be a set of images at predefined intervals throughout the temperature profile. In some embodiments, operation 402 receives the one or more thermographic images while the component is undergoing fabrication steps (e.g., in real time).

Operation 404 includes determining whether the unpowered component is defective based on output from a machine learning model. Operation 404 can include inputting the thermographic images received in operation 402 into a machine learning model and receiving an output indicating a quality classification of the component from the machine learning model.

Operation 406 includes presenting a quality classification with an identifier of the unpowered component. Operation 406 can present the quality classification and/or the identifier to a user interface as part of a QA/QC software graphical user interface (GUI) (e.g., thermographic quality analysis software 104 of FIG. 1).

Figure 5A:
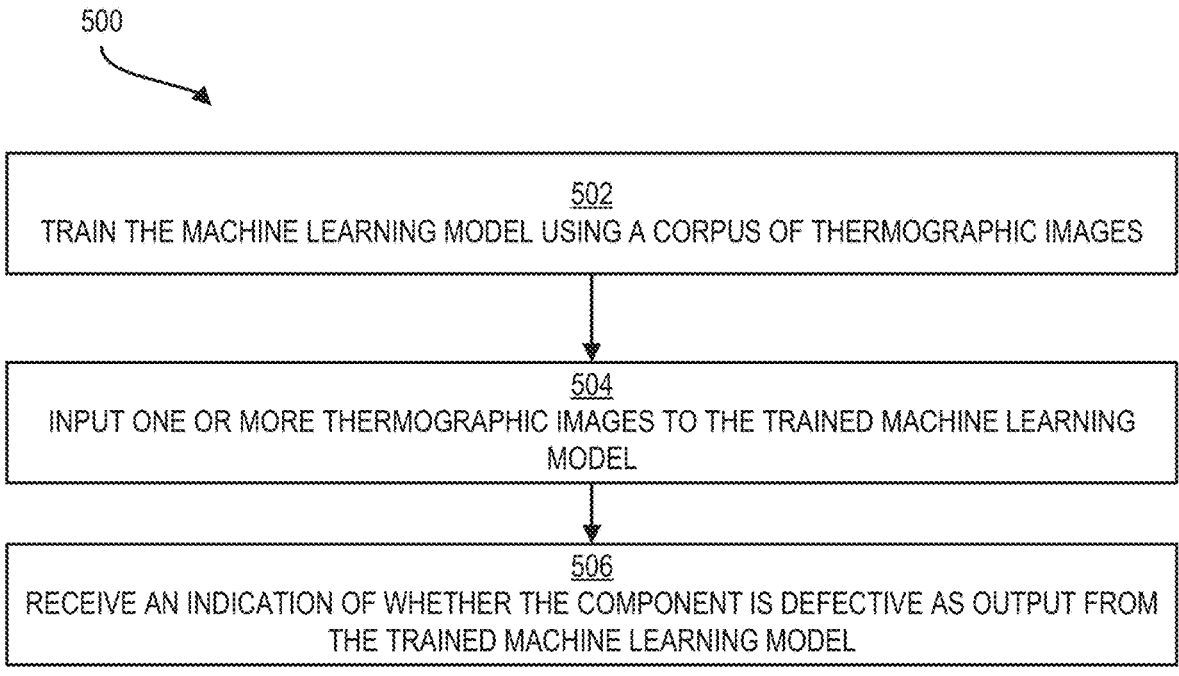
FIG. 5A illustrates a flowchart of an example method for training a machine learning model for determining whether thermographic images of a component indicate that the component is defective, in accordance with some embodiments of the present disclosure.

FIG. 5A illustrates a flowchart of an example method 500 for training a machine learning model for determining whether thermographic images of a component indicate that the component is defective, in accordance with some embodiments of the present disclosure. In some embodiments, the method 500 can be implemented by a server (e.g., server 102 of FIG. 1), a computer, a processor, or another configuration of hardware and/or software. In some embodiments, the method 500 is a sub-method of operation 404 of FIG. 4.

Operation 502 includes training the machine learning model using a corpus of thermographic images. The machine learning model can be trained according to any of the techniques previously described with respect to machine learning model 118 of FIG. 1 (or any other machine learning model techniques, now known or later developed).

Operation 504 includes inputting one or more thermographic images to the trained machine learning model. In some embodiments, the one or more thermographic images can be a single image of a component after undergoing a predefined temperature profile. In other embodiments, the one or more thermographic images can be sequential ones of a plurality of thermographic images of the component undergoing a predefined temperature profile.

Operation 506 includes receiving an indication of whether the component is defective as output from the trained machine learning model. In some embodiments, operation 506 outputs a quality classification such as quality classification 124 of FIG. 1.

Advantageously, utilizing a trained machine learning model can increase efficiency and/or accuracy of quality dispositions of components. For example, the machine learning model can be trained such that it is capable of differentiating between innocuous variability between components (e.g., acceptably different surface finishes and/or colors resulting in different emissivity when exposed to the external heat source) and problematic variability between components (e.g., indicating a missing internal component). In this way, the corpus of thermographic images used to train the machine learning model can make the machine learning model relatively generalizable to multiple types, models, vendors, and/or brands of similar components.

Figure 5B:
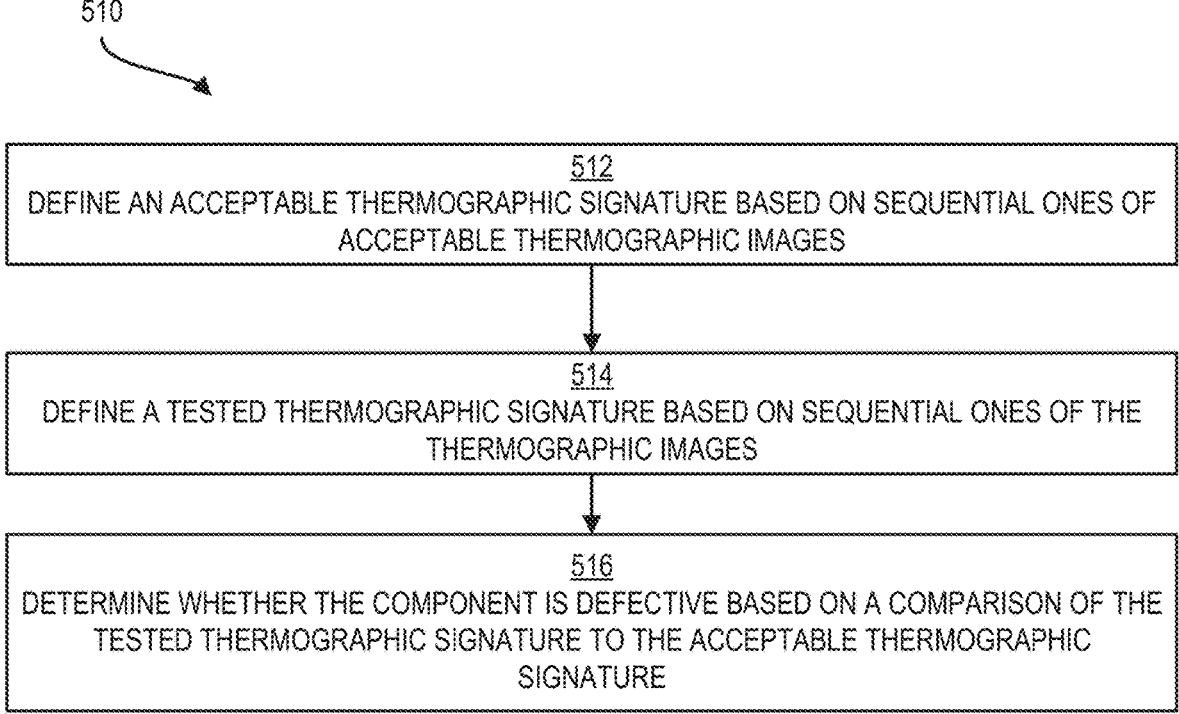
FIG. 5B illustrates a flowchart of an example method for determining whether thermographic images of a component indicate that the component is defective based on thermographic signatures, in accordance with some embodiments of the present disclosure.

FIG. 5B illustrates a flowchart of an example method 510 for determining whether thermographic images of a component indicate that the component is defective based on thermographic signatures, in accordance with some embodiments of the present disclosure. In some embodiments, the method 510 can be implemented by a server (e.g., server 102 of FIG. 1), a computer, a processor, or another configuration of hardware and/or software. In some embodiments, the method 510 is a sub-method of operation 404 of FIG. 4.

Operation 512 includes defining an acceptable thermographic signature based on sequential ones of acceptable thermographic images. Sequential ones of the acceptable thermographic images can be two or more sequential images of a component undergoing a temperature profile, where the sequential nature of the two or more images captures a rate of heat distribution throughout the component. The rate of heat distribution defined by two or more images can be beneficial by providing a more unique thermographic signature than any single image might provide. In some embodiments, operation 512 can utilize a machine learning model to define the acceptable thermographic signature. In some embodiments, operation 512 can also define one or more unacceptable thermographic signatures. The one or more unacceptable thermographic signatures can indicate a type of out-of-compliance component such as a defective component, a counterfeit component, a damaged component, and the like.

Operation 514 includes defining a tested thermographic signature based on sequential ones of the thermographic images. The tested thermographic signature can be characterized in the same manner as the acceptable thermographic signature of operation 512 but based on a test component (rather than a component from a corpus of thermographic images).

Operation 516 includes determining whether a component is defective based on a comparison of the tested thermographic signature to the acceptable thermographic signature. For example, if the tested thermographic signature matches (within a threshold range) the acceptable thermographic signature, then the component can be determined to be acceptable, otherwise the component can be determined to be defective. In some embodiments, operation 516 can generate quality classification 124 of FIG. 1.

Figure 6:
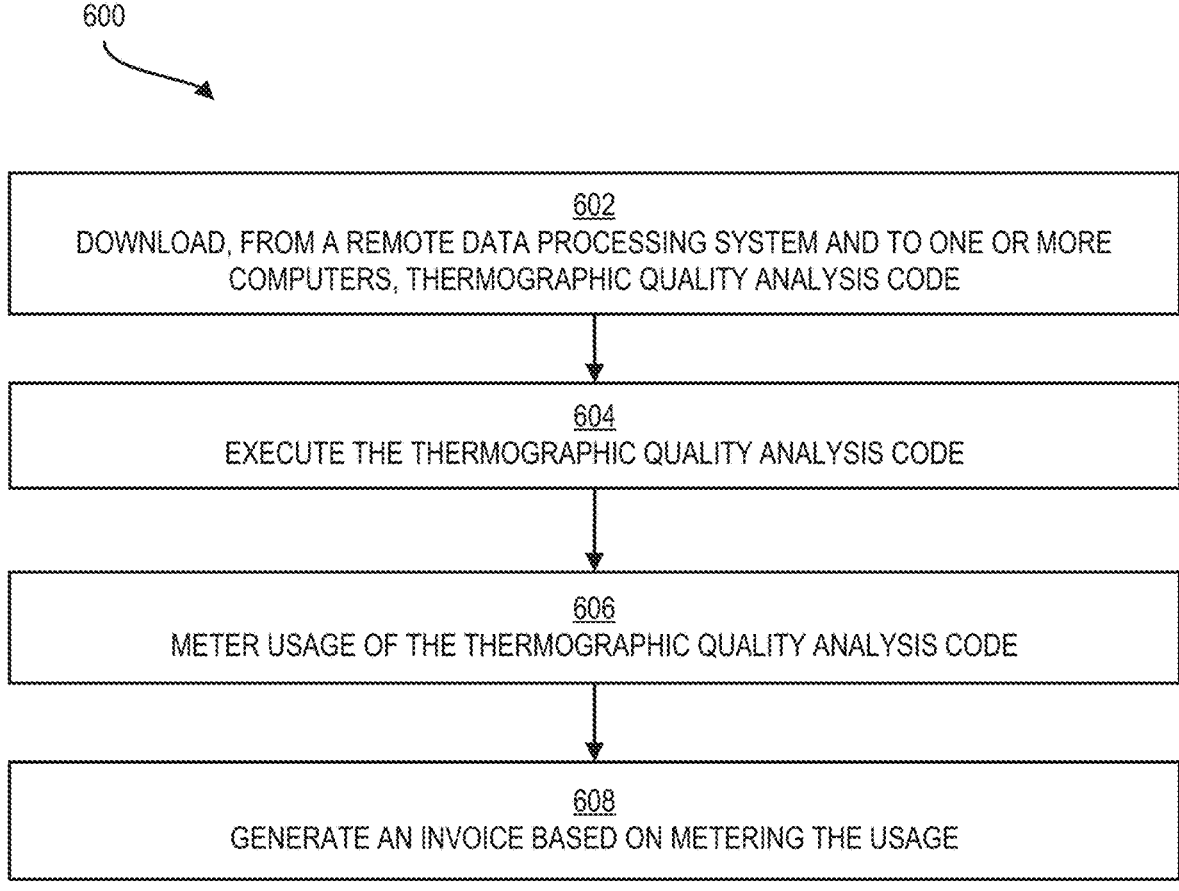
FIG. 6 illustrates a flowchart of an example method for downloading, deploying, metering, and billing usage of thermographic quality analysis code, in accordance with some embodiments of the present disclosure.

FIG. 6 illustrates a flowchart of an example method 600 for downloading, deploying, metering, and billing usage of thermographic quality analysis code, in accordance with some embodiments of the present disclosure. In some embodiments, the method 600 is implemented by a server (e.g., server 102 of FIG. 1), a computer, a processor, or another configuration of hardware and/or software. In some embodiments, the method 600 occurs concurrently with method 400 of FIG. 4.

Operation 602 includes downloading, from a remote data processing system and to one or more computers (e.g., server 102) thermographic quality analysis code (e.g., thermographic quality analysis software 104 of FIG. 1, thermographic quality analysis code 746 of FIG. 7). Operation 604 includes executing the thermographic quality analysis code. Operation 604 can include performing any of the methods and/or functionalities discussed herein. Operation 606 includes metering usage of the thermographic quality analysis code. Usage can be metered by, for example, an amount of time the thermographic quality analysis code is used, a number of servers and/or devices deploying the thermographic quality analysis code, an amount of resources consumed by implementing the thermographic quality analysis code, a number of thermographic images processed and/or quality classifications generated by implementing the thermographic quality analysis code, and/or other usage metering metrics. Operation 608 includes generating an invoice based on metering the usage.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 7 illustrates a block diagram of an example computing environment, in accordance with some embodiments of the present disclosure. Computing environment 700 contains an example of an environment for the execution of at least some of the computer code involved in performing the inventive methods, such as thermographic quality analysis code 746. In addition to thermographic quality analysis code 746, computing environment 700 includes, for example, computer 701, wide area network (WAN) 702, end user device (EUD) 703, remote server 704, public cloud 705, and private cloud 706. In this embodiment, computer 701 includes processor set 710 (including processing circuitry 720 and cache 721), communication fabric 711, volatile memory 712, persistent storage 713 (including operating system 722 and thermographic quality analysis code 746, as identified above), peripheral device set 714 (including user interface (UI), device set 723, storage 724, and Internet of Things (IoT) sensor set 725), and network module 715. Remote server 704 includes remote database 730. Public cloud 705 includes gateway 740, cloud orchestration module 741, host physical machine set 742, virtual machine set 743, and container set 744.

COMPUTER 701 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 730. As is well understood in the art of computer technology, and depending upon the technology, performance of a computer-implemented method may be distributed among multiple computers and/or between multiple locations. On the other hand, in this presentation of computing environment 700, detailed discussion is focused on a single computer, specifically computer 701, to keep the presentation as simple as possible. Computer 701 may be located in a cloud, even though it is not shown in a cloud in FIG. 7. On the other hand, computer 701 is not required to be in a cloud except to any extent as may be affirmatively indicated.

PROCESSOR SET 710 includes one, or more, computer processors of any type now known or to be developed in the future. Processing circuitry 720 may be distributed over multiple packages, for example, multiple, coordinated integrated circuit chips. Processing circuitry 720 may implement multiple processor threads and/or multiple processor cores. Cache 721 is memory that is located in the processor chip package(s) and is typically used for data or code that should be available for rapid access by the threads or cores running on processor set 710. Cache memories are typically organized into multiple levels depending upon relative proximity to the processing circuitry. Alternatively, some, or all, of the cache for the processor set may be located "off chip." In some computing environments, processor set 710 may be designed for working with qubits and performing quantum computing.

Computer readable program instructions are typically loaded onto computer 701 to cause a series of operational steps to be performed by processor set 710 of computer 701 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 721 and the other storage media discussed below. The program instructions, and associated data, are accessed by processor set 710 to control and direct performance of the inventive methods. In computing environment 700, at least some of the instructions for performing the inventive methods may be stored in thermographic quality analysis code 746 in persistent storage 713.

COMMUNICATION FABRIC 711 is the signal conduction paths that allow the various components of computer 701 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 712 is any type of volatile memory now known or to be developed in the future. Examples include dynamic type random access memory (RAM) or static type RAM. Typically, the volatile memory is characterized by random access, but this is not required unless affirmatively indicated. In computer 701, the volatile memory 712 is located in a single package and is internal to computer 701, but, alternatively or additionally, the volatile memory may be distributed over multiple packages and/or located externally with respect to computer 701.

PERSISTENT STORAGE 713 is any form of non-volatile storage for computers that is now known or to be developed in the future. The non-volatility of this storage means that the stored data is maintained regardless of whether power is being supplied to computer 701 and/or directly to persistent storage 713. Persistent storage 713 may be a read only memory (ROM), but typically at least a portion of the persistent storage allows writing of data, deletion of data and re-writing of data. Some familiar forms of persistent storage include magnetic disks and solid state storage devices. Operating system 722 may take several forms, such as various known proprietary operating systems or open source Portable Operating System Interface type operating systems that employ a kernel. The code included in thermographic quality analysis code 746 typically includes at least some of the computer code involved in performing the inventive methods.

PERIPHERAL DEVICE SET 714 includes the set of peripheral devices of computer 701. Data communication connections between the peripheral devices and the other components of computer 701 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 723 may include components such as a display screen, speaker, microphone, wearable devices (such as goggles and smart watches), keyboard, mouse, printer, touchpad, game controllers, and haptic devices. Storage 724 is external storage, such as an external hard drive, or insertable storage, such as an SD card. Storage 724 may be persistent and/or volatile. In some embodiments, storage 724 may take the form of a quantum computing storage device for storing data in the form of qubits. In embodiments where computer 701 is required to have a large amount of storage (for example, where computer 701 locally stores and manages a large database) then this storage may be provided by peripheral storage devices designed for storing very large amounts of data, such as a storage area network (SAN) that is shared by multiple, geographically distributed computers. IoT sensor set 725 is made up of sensors that can be used in Internet of Things applications. For example, one sensor may be a thermometer and another sensor may be a motion detector.

NETWORK MODULE 715 is the collection of computer software, hardware, and firmware that allows computer 701 to communicate with other computers through WAN 702. Network module 715 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 715 are performed on the same physical hardware device. In other embodiments (for example, embodiments that utilize software-defined networking (SDN)), the control functions and the forwarding functions of network module 715 are performed on physically separate devices, such that the control functions manage several different network hardware devices. Computer readable program instructions for performing the inventive methods can typically be downloaded to computer 701 from an external computer or external storage device through a network adapter card or network interface included in network module 715.

WAN 702 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 703 is any computer system that is used and controlled by an end user (for example, a customer of an enterprise that operates computer 701), and may take any of the forms discussed above in connection with computer 701. EUD 703 typically receives helpful and useful data from the operations of computer 701. For example, in a hypothetical case where computer 701 is designed to provide a recommendation to an end user, this recommendation would typically be communicated from network module 715 of computer 701 through WAN 702 to EUD 703. In this way, EUD 703 can display, or otherwise present, the recommendation to an end user. In some embodiments, EUD 703 may be a client device, such as thin client, heavy client, mainframe computer, desktop computer and so on.

REMOTE SERVER 704 is any computer system that serves at least some data and/or functionality to computer 701. Remote server 704 may be controlled and used by the same entity that operates computer 701. Remote server 704 represents the machine(s) that collect and store helpful and useful data for use by other computers, such as computer 701. For example, in a hypothetical case where computer 701 is designed and programmed to provide a recommendation based on historical data, then this historical data may be provided to computer 701 from remote database 730 of remote server 704.

PUBLIC CLOUD 705 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 705 is performed by the computer hardware and/or software of cloud orchestration module 741. The computing resources provided by public cloud 705 are typically implemented by virtual computing environments that run on various computers making up the computers of host physical machine set 742, which is the universe of physical computers in and/or available to public cloud 705. The virtual computing environments (VCEs) typically take the form of virtual machines from virtual machine set 743 and/or containers from container set 744. It is understood that these VCEs may be stored as images and may be transferred among and between the various physical machine hosts, either as images or after instantiation of the VCE. Cloud orchestration module 741 manages the transfer and storage of images, deploys new instantiations of VCEs and manages active instantiations of VCE deployments. Gateway 740 is the collection of computer software, hardware, and firmware that allows public cloud 705 to communicate through WAN 702.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 706 is similar to public cloud 705, except that the computing resources are only available for use by a single enterprise. While private cloud 706 is depicted as being in communication with WAN 702, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 705 and private cloud 706 are both part of a larger hybrid cloud.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or subset of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the process software (e.g., any software configured to perform any portion of the methods described previously and/or implement any of the functionalities described previously) can be deployed by manually loading it directly in the client, server, and proxy computers via loading a storage medium such as a CD, DVD, etc., the process software can also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Embodiments of the present invention can also be delivered as part of a service engagement with a client corporation, nonprofit organization, government entity, internal organizational structure, or the like. These embodiments can include configuring a computer system to perform, and deploying software, hardware, and web services that implement, some or all of the methods described herein. These embodiments can also include analyzing the client's operations, creating recommendations responsive to the analysis, building systems that implement subsets of the recommendations, integrating the systems into existing processes and infrastructure, metering use of the systems, allocating expenses to users of the systems, and billing, invoicing (e.g., generating an invoice), or otherwise receiving payment for use of the systems.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

Any advantages discussed in the present disclosure are example advantages, and embodiments of the present disclosure can exist that realize all, some, or none of any of the discussed advantages while remaining within the spirit and scope of the present disclosure.

A non-limiting list of examples are provided hereinafter to demonstrate some aspects of the present disclosure. Example 1 is a system. The system includes a test chamber for receiving an unpowered component; an external heat source for heating the unpowered component for a predetermined period of time; a thermographic imaging system for collecting thermographic images of the unpowered component during the predetermined period of time; and a computer communicatively coupled to the thermographic imaging system and configured to classify a quality of the unpowered component based on the thermographic images of the unpowered component.

Example 2 includes the features of Example 1, including or excluding optional features. In this example, the computer stores a machine learning model, wherein the machine learning model is trained using a corpus of thermographic images for the unpowered component. Optionally, the computer stores computer-executable instructions configured to cause the computer to perform a method comprising: receiving the thermographic images of the unpowered component from the thermographic imaging system; inputting the thermographic images of the unpowered component to the machine learning model; receiving an output from the machine learning model; and storing a classification with an identifier of the unpowered component in the computer, wherein the classification is based on the output from the machine learning model. Optionally, the corpus of thermographic images for the unpowered component comprises acceptable thermographic images for the unpowered component and unacceptable thermographic images for the unpowered component, wherein sequential ones of the acceptable thermographic images collectively define acceptable thermal paths for the unpowered component, wherein sequential ones of the unacceptable thermographic images collectively define unacceptable thermal paths for the unpowered component, wherein the thermographic images collected by the thermographic imaging system collectively define a thermal path of the unpowered component, and wherein the thermal path represents a rate of temperature change through the unpowered component during the predetermined period of time. Optionally, wherein the corpus of thermographic images of the unpowered component include a schematic of the unpowered component overlayed with the thermographic images, and wherein the schematic enables the machine learning model to correlate respective thermographic signatures to discrete features of the unpowered component illustrated in the schematic.

Example 3 includes the features of any one of Examples 1 to 2, including or excluding optional features. In this example, the external heat source is a conductive heat source, and wherein the unpowered component is in physical contact with the conductive heat source in the test chamber. Optionally, the test chamber is configured to modify a pressure of the unpowered component. Optionally, modifying the pressure includes drawing a vacuum on the unpowered component.

Example 4 includes the features of any one of Examples 1 to 2, including or excluding optional features. In this example, the external heat source is a convective heat source, and wherein convective heat source circulates air at a predetermined temperature in the test chamber.

Example 5 includes the features of any one of Examples 1 to 2, including or excluding optional features. In this example, the external heat source is a radiant heat source comprising an infrared light, and wherein the unpowered component is exposed to the infrared light in the test chamber. Optionally, the test chamber is configured to modify a pressure of the unpowered component. Optionally, modifying the pressure includes drawing a vacuum on the unpowered component.

Example 6 includes the features of any one of Examples 1 to 5, including or excluding optional features. In this example, the unpowered component comprises an electronic circuit board.

Example 7 is a computer-implemented method. The computer-implemented method includes receiving, at a computer and from a thermographic imaging system, thermographic images of an unpowered component exposed to an external heat source for a predetermined period of time; determining, by a machine learning model implemented on the computer, whether the unpowered component is defective, wherein the machine learning model is trained using a corpus of historical thermographic images for the unpowered component; and presenting a quality classification with an identifier of the unpowered component on an interface communicatively coupled to the computer, wherein the classification is based on an output of the machine learning model.

Example 8 includes the features of Example 7. In this example, the external heat source is a conductive heat source, and wherein the unpowered component is in physical contact with the conductive heat source.

Example 9 includes the features of Example 7. In this example, the external heat source is a convective heat source, and wherein the unpowered component is in a chamber having air circulated at a predetermined temperature.

Example 10 includes the features of Example 7. In this example, the external heat source is a radiant heat source comprising an infrared light, and wherein the unpowered component is exposed to the infrared light.

Example 11 includes the features of any one of Examples 7 to 10. In this example, the corpus of historical thermographic images for the unpowered component comprises acceptable thermographic images for the unpowered component and unacceptable thermographic images for the unpowered component. Optionally, the method further comprising: defining an acceptable thermographic signature for the unpowered component based on the acceptable thermographic images for the unpowered component; defining a tested thermographic signature of the unpowered component based on the thermographic images of the unpowered component; and wherein determining whether the unpowered component is defective comprises determining whether the acceptable thermographic signature matches, within a threshold range, the tested thermographic signature. Optionally, the acceptable thermographic signature and the tested thermographic signature represent thermal paths indicating rates of temperature changes through the unpowered component during the predetermined period of time.

Example 12 includes the features of any one of Examples 7 to 11, including or excluding optional features. In this example, the method further comprising: determining that the unpowered component is defective, and wherein a defect of the unpowered component is at least one selected from a group consisting of: a missing aspect of the unpowered component, an incorrect aspect of the unpowered component, a mis-oriented aspect of the unpowered component, a damaged aspect of the unpowered component, and a counterfeit aspect of the unpowered component.

Example 13 includes the features of any one of Examples 7 to 12, including or excluding optional features. In this example, the unpowered component comprises an electronic circuit board.

Example 14 includes the features of any one of Examples 7 to 13, including or excluding optional features. In this example, the method is performed by the computer based on thermographic quality analysis software provided to the computer from a remote data processing system. Optionally, the method further comprises: metering usage of the thermographic quality analysis software; and generating an invoice based on metering the usage of the thermographic quality analysis software.

Example 15 is a system. The system includes one or more computer readable storage media storing program instructions; and one or more processors which, in response to executing the program instructions, are configured to perform a method according to any one of Examples 7 to 14, including or excluding optional features.

Example 16 is a computer program product. The computer program product includes one or more computer readable storage media, and program instructions collectively stored on the one or more computer readable storage media, the program instructions comprising instructions configured to cause one or more processors to perform a method according to any one of Examples 7 to 14, including or excluding optional features.

What is claimed is:

1. A computer-implemented method, wherein the computer-implemented method is performed by a computer based on thermographic quality analysis software provided to the computer from a remote data processing system, the computer-implemented method comprising:

receiving, at the computer and from a thermographic imaging system, thermographic images of an unpowered component exposed to an external heat source for a predetermined period of time;

determining, by a machine learning model implemented on the computer, whether the unpowered component is defective, wherein the machine learning model is trained using a corpus of historical thermographic images for the unpowered component; and presenting a quality classification with an identifier of the unpowered component on an interface communicatively coupled to the computer, wherein the classification is based on an output of the machine learning model;

metering usage of the thermographic quality analysis software; and generating an invoice based on metering the usage of the thermographic quality analysis software.

2. The method of claim 1, wherein the external heat source is a conductive heat source, and wherein the unpowered component is in physical contact with the conductive heat source.

3. The method of claim 1, wherein the external heat source is a convective heat source, and wherein the unpowered component is in a chamber having air circulated at a predetermined temperature.

4. The method of claim 1, wherein the external heat source is a radiant heat source comprising an infrared light, and wherein the unpowered component is exposed to the infrared light.

5. The method of claim 1, wherein the corpus of historical thermographic images for the unpowered component comprises acceptable thermographic images for the unpowered component and unacceptable thermographic images for the unpowered component.

6. The method of claim 5, further comprising:

defining an acceptable thermographic signature for the unpowered component based on the acceptable thermographic images for the unpowered component;

defining a tested thermographic signature of the unpowered component based on the thermographic images of the unpowered component; and wherein determining whether the unpowered component is defective comprises determining whether the acceptable thermographic signature matches, within a threshold range, the tested thermographic signature.

7. The method of claim 6, wherein the acceptable thermographic signature and the tested thermographic signature represent thermal paths indicating rates of temperature changes through the unpowered component during the predetermined period of time.

8. The method of claim 1, further comprising:

determining that the unpowered component is defective, and wherein a defect of the unpowered component is at least one selected from a group consisting of: a missing aspect of the unpowered component, an incorrect aspect of the unpowered component, a mis-oriented aspect of the unpowered component, a damaged aspect of the unpowered component, and a counterfeit aspect of the unpowered component.

9. A computer-implemented method comprising:

receiving, at a computer and from a thermographic imaging system, a sequence of thermographic images of an unpowered component exposed to an external heat source for a predetermined period of time;

determining, by a machine learning model implemented on the computer, whether the unpowered component is defective, wherein the machine learning model is trained using a corpus of historical thermographic images for the unpowered component, wherein the corpus of historical thermographic images includes a schematic of a component overlayed with each of the corpus of historical thermographic images; and presenting a quality classification with an identifier of the unpowered component on an interface communicatively coupled to the computer, wherein the classification is based on an output of the machine learning model.

10. The method of claim 9, wherein the external heat source is a conductive heat source, and wherein the unpowered component is in physical contact with the conductive heat source.

11. The method of claim 9, wherein the external heat source is a convective heat source, and wherein the unpowered component is in a chamber having air circulated at a predetermined temperature.

12. The method of claim 9, wherein the external heat source is a radiant heat source comprising an infrared light, and wherein the unpowered component is exposed to the infrared light.

13. The method of claim 9, wherein the corpus of historical thermographic images for the unpowered component comprises acceptable thermographic images for the unpowered component and unacceptable thermographic images for the unpowered component.

14. The method of claim 13, further comprising:

defining an acceptable thermographic signature for the unpowered component based on the acceptable thermographic images for the unpowered component;

defining a tested thermographic signature of the unpowered component based on the sequence of thermographic images of the unpowered component; and wherein determining whether the unpowered component is defective comprises determining whether the acceptable thermographic signature matches, within a threshold range, the tested thermographic signature.

15. The method of claim 14, wherein the acceptable thermographic signature and the tested thermographic signature represent thermal paths indicating rates of temperature changes through the unpowered component during the predetermined period of time.

16. The method of claim 9, further comprising:

determining that the unpowered component is defective, and wherein a defect of the unpowered component is at least one selected from a group consisting of: a missing aspect of the unpowered component, an incorrect aspect of the unpowered component, a mis-oriented aspect of the unpowered component, a damaged aspect of the unpowered component, and a counterfeit aspect of the unpowered component.

17. The method of claim 9, wherein the schematic of the component is a photograph.

18. The method of claim 9, wherein the schematic of the component is a Computer Aided Design (CAD) drawing.

\* \* \* \* \*